United States Patent
Yu et al.

(10) Patent No.: US 6,424,591 B1
(45) Date of Patent: Jul. 23, 2002

(54) NETWORK INTERFACE SUPPORTING FIFO-TYPE AND SRAM-TYPE ACCESSES TO INTERNAL BUFFER MEMORY

(75) Inventors: Ching Yu, Santa Clara; Autumn Jane Niu, Sunnyvale, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/321,843

(22) Filed: May 28, 1999

(51) Int. Cl.[7] .................................. G06F 12/00

(52) U.S. Cl. .................... 365/230.09; 711/101

(58) Field of Search .................. 711/1, 101, 104, 711/132; 710/52, 53, 54, 74, 130, 131; 365/189.05, 230.08, 230.09

(56) References Cited

U.S. PATENT DOCUMENTS

| | | | | | |
|---|---|---|---|---|---|
| 4,628,477 A | * | 12/1986 | Burrows | .................... | 711/219 |
| 5,247,626 A | * | 9/1993 | Firoozmand | ............... | 709/212 |
| 5,745,731 A | * | 4/1998 | Kim et al. | .................. | 711/149 |
| 5,901,100 A | * | 5/1999 | Taylor | ....................... | 365/219 |
| 6,026,032 A | * | 2/2000 | Nordman et al. | ...... | 365/189.05 |
| 6,044,416 A | * | 3/2000 | Hasan | ....................... | 710/52 |

* cited by examiner

Primary Examiner—B. James Peikari

(57) ABSTRACT

A novel method of providing a host with assess to a buffer memory in a network interface in FIFO and SRAM modes of operation. A decoder decodes whether the host issues an SRAM-type access request or a FIFO-type access request to perform access to the buffer memory. In response to the FIFO-type access request, pointers to the memory are controlled so as to perform sequential addressing of the buffer memory. In response to the SRAM-type request, the pointers are controlled so as to perform random access addressing of the buffer memory.

17 Claims, 4 Drawing Sheets

NETWORK INTERFACE SUPPORTING FIFO-TYPE AND SRAM-TYPE ACCESSES TO INTERNAL BUFFER MEMORY

FIELD OF THE INVENTION

The present application relates to data communications and more particularly to a network interface configured to support first-in, first-out (FIFO)-type accesses as well as static random access memory (SRAM)-type accesses to its buffer memory.

BACKGROUND ART

In a data communications network, such as an Ethernet (IEEE 802.3) network, a network controller chip provides interface between a local bus of a computer system and network media. The network controller has buffer memories provided between. a system memory interface and a media interface for temporarily storing data transferred between a system memory and a communications network. In particular, a receive buffer memory accumulates receive data supplied from the network, before transferring the data to the system memory, whereas a transmit; buffer memory is involved in transferring transmit data from the system memory to the network.

Some of computer systems utilize FIFO buffers, whereas other systems use static random access memory (SRAM) buffers. Therefore, to support compatibility with the systems having FIFO-type buffer memory access as well as with the systems having SRAM-type buffer memory access, it would be desirable to provide a network controller having a buffer memory accessible in a random access manner and in a FIFO manner.

DISCLOSURE OF THE INVENTION

The present invention! offers a novel method of providing a host with assess to a memory in FIFO and SRAM modes of operation. The method includes decoding whether the host issues a SRAM-type access request or a FIFO-type access request to perform access to the memory. In response to the FIFO-type access request, pointers to the memory are controlled so as to perform sequential addressing of the memory. In response to the SRAM-type request, the pointers are controlled so as to perform random access addressing of the memory.

In accordance with one aspect of the invention, a network interface controlled by a host comprises a host interface for providing interface to the host, a buffer memory for temporarily storing data, and an access control system for providing the. host with SRAM-type access to the buffer memory in a SRAM mode of operation, and with FIFO-type access to the buffer memory in a FIFO mode of operation.

In a preferred embodiment, the access control system comprises a pointer control mechanism for producing pointers to locations of the buffer memory to be accessed in the SRAM mode and FIFO mode. The pointer control mechanism may comprise a decoder for detecting requests from the host for the SRAM-type access and the FIFO-type access. A pointer control circuit may be responsive to a select signal from the decoder for providing sequential addressing of the buffer memory in the FIFO mode. In response to an address signal from the host, the pointer control circuit provides random-access addressing of the buffer memory in the SRAM mode.

The pointer control circuit may comprise a select multiplexer having a FIFO-mode input and a SRAM-mode input. An incrementing circuit coupled to the FIFO-mode input of the multiplexer may be supplied with the select signal, which also may be provided to a control input of the multiplexer. The SRAM-mode input may be supplied with the address signal.

In accordance with another aspect of the invention, a communication device controlled by a host comprises a transmit buffer for temporarily storing transmit data, and a receive buffer for temporarily storing receive data. A pointer control mechanism controls write pointers to locations of the transmit buffer so as to enable the host to write the transmit data in a random access manner and in a FIFO manner. Read pointers to locations of the-receive buffer are controlled so as to enable the host to read the receive data in a random access manner and in a FIFO manner.

The pointer control mechanism may comprise a write pointer control circuit for producing the write pointers, and a read pointer control circuit for producing the read pointers. In response to the FIFO-type access request from the host, the write pointer control circuit and read pointer control circuit may be supplied with the select signal to provide sequential addressing of the transmit buffer and the receive buffer. In response to the SRAM-type access request, the write pointer control circuit and read pointer control circuit are supplied with the address signal to provide random-access addressing of the transmit buffer and the receive buffer.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Although the invention has general applicability in the field of data processing, the best mode for practicing the invention is based in part on the realization of a network interface in a packet switched network, such as an Ethernet (EEE 802.3) network.

Figure 1A:
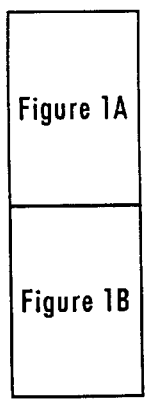
FIGS. 1A and 1B comprise a block diagram of an exemplary network interface, in which the present invention may be implemented.
Figure 1B:
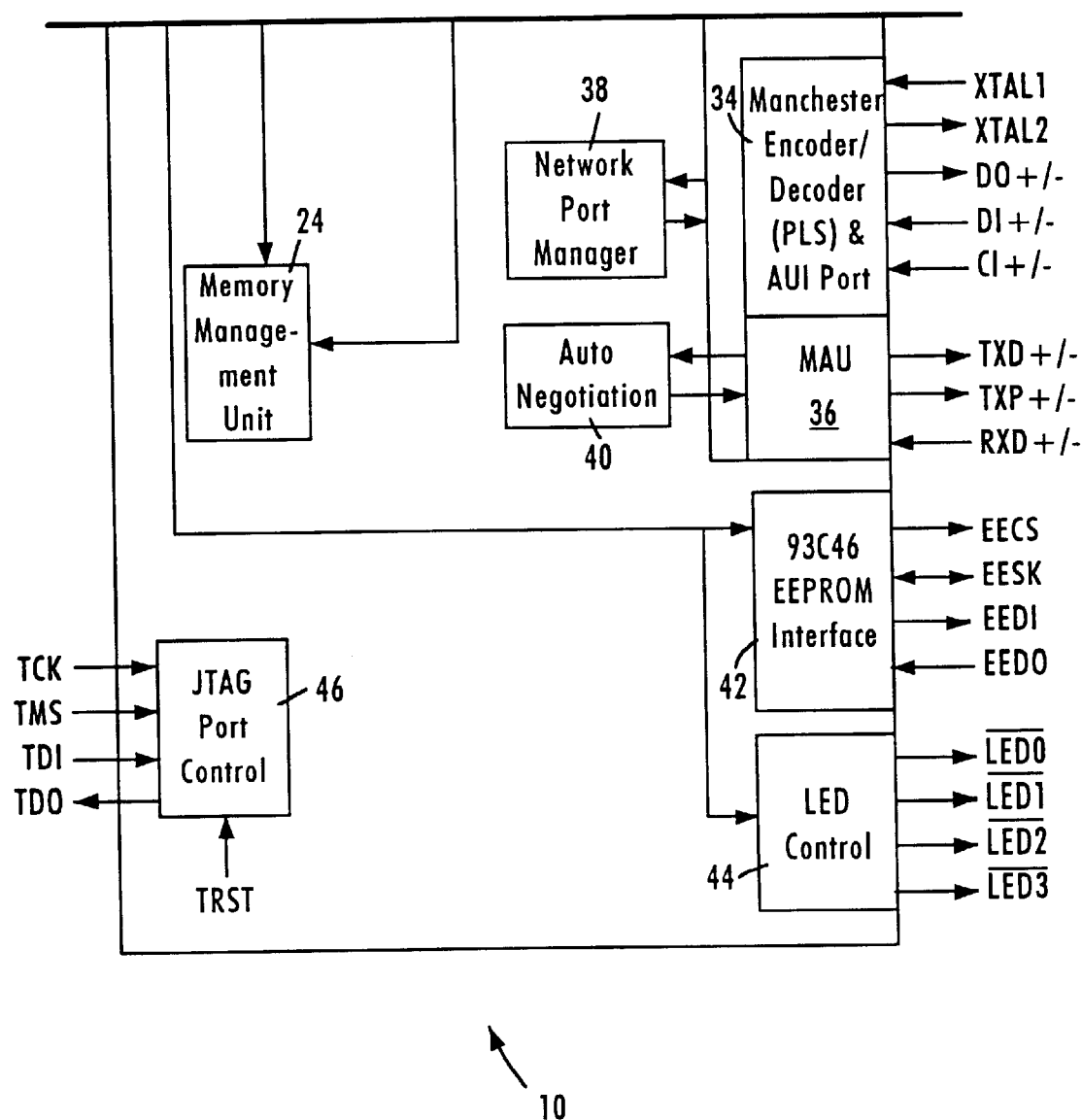

FIG. 1 is a block diagram of an exemplary network interface 10 that accesses the media of an Ethernet (ANSI/ EEE 802.3) network. The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit (BIU) 16, a buffer memory portion 18, and a network interface portion 20. The PCI bus interface unit 16 may provide an interface with an external CPU or other host via the PCI local bus. The PCI bus interface unit 16 may include a PCI slave interface 16a and a DMA interface 16b. The slave interface 16a manages PCI control and status information including reading and programming of the PCI status registers, and is configured for managing slave transfers via the PCI bus with a host CPU. The DMA interface 16b manages DMA transfers by the network interface 10 to and from a system memory coupled to the PCI bus 12. Hence, the PCI bus interface unit 16 can be selectively configured for PCI transfers in slave and/or master (e.g., DMA) mode. In accordance with the PCI local bus specification, revision 2.1, the PCI bus interface unit 16 has a 32-bit address/data bus AD[31:0] for providing address and data transfers.

A control and register (CAR) block 17 is interfaced to the PCI bus interface 16 to allow. read and write accesses to various registers in the network interface 10. As discussed in, more detail later, the CAR block 17 contains a command register, which produces command signals sent to other blocks of the interface 10 . Also, the CAR block 17 comprises registers accessible by the host CPU for read and write operations through the PCI bus interface 16.

The memory portion 18 includes a 16-bit SRAM 18 implemented directly on the network interface chip 10. According to the disclosed embodiment, the SRAM 18 may be segmented: into a receive SRAM portion 18a and a transmit SRAM portion 18b for receive ,and transmit paths, respectively.

The network interface 10 also includes a memory management unit (MMU) 24 controlling all transfers of data to and from the memory unit 18. The MMU 24 may be configured for managing DMA transfers via the DMA interface 16b. DMA transfers are managed based on DMA descriptors that specify start address, length, etc. The MMU 24 initiates a DMA read from the system memory into the transmit SRAM 18b by issuing an instruction to the DMA interface 16b, which translates the instructions into PCI bus cycles. Also, the MMU 24 handles DMA data transfers from the receive SRAM 18a to the system memory via the PCI bus 12. Hence, the MMU 24 contains descriptor management for DMA transfers, as well as pointers associated with storing and reading data from the memory portion 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

The auto-negotiation portion 40 performs EEE-compliant negotiation with a link partner on the PHY layer to exchange data indicating whether the link partner is capable of operating at 10 Mb/s, 100 Mb/s, and whether the link should be half-duplex or full-duplex.

The EEPROM interface 42 connects to an EEPROM on either a network interface adapter card or the motherboard of the host computer via a serial interface link. The EEPROM (not shown in FIG. 1) may be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down. The LED controller 44 selectively controls the generation of LED output signals based upon the internal decoding logic and network interface status registers (not shown).

Figure 2:
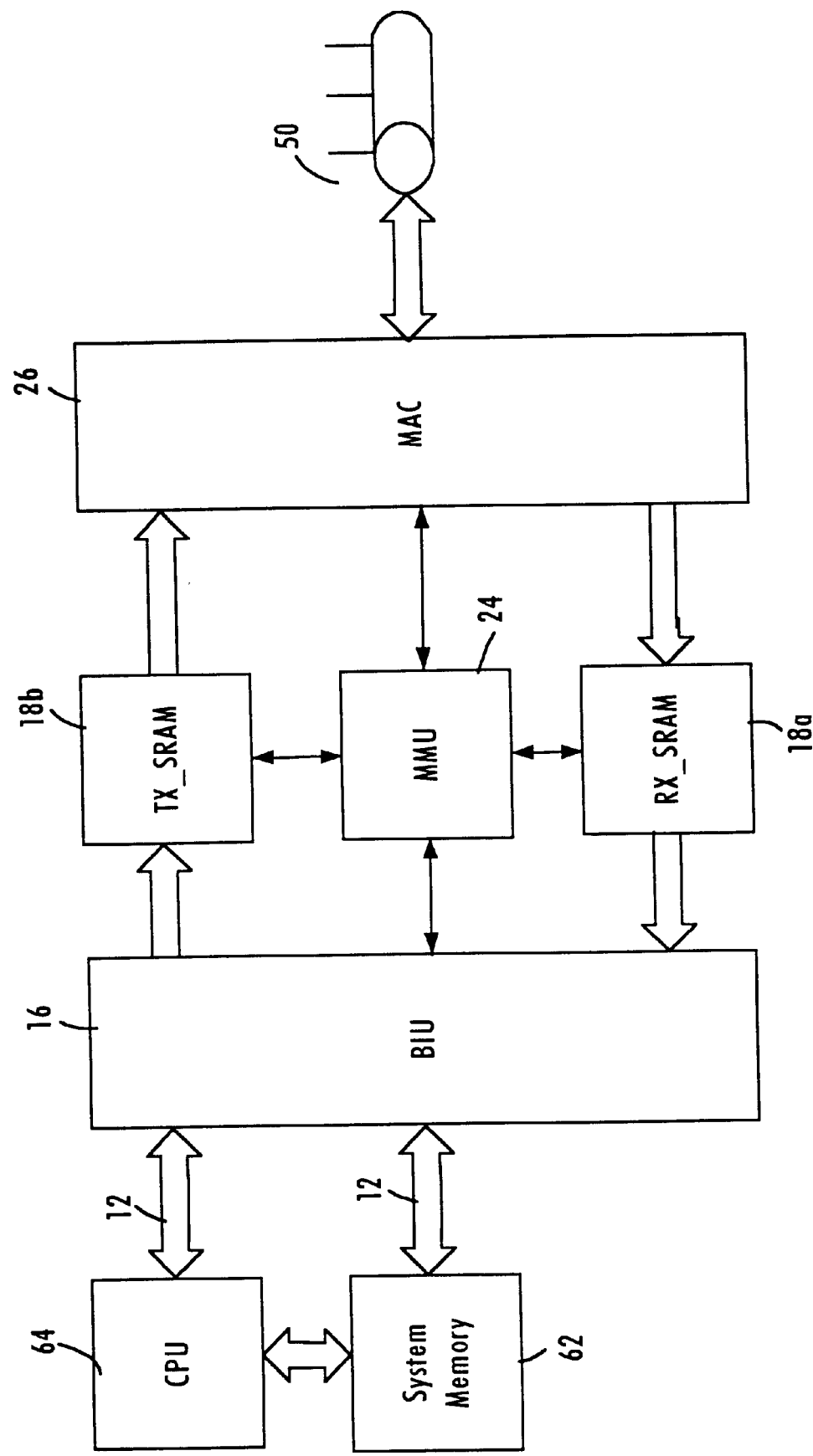
FIG. 2 is a block-diagram illustrating access to buffers in the network interface.

Thus, as illustrated in FIG. 2, the network interface 10 supplies a receive data flow from the Ethernet network 50 via the MAC block 26 to the internal receive SRAM buffer 18a. Then, the receive data from the receive SRAM buffer 18a are transferred via the bus interface unit 16 and the PCI interface 12 to the system memory 62. A transmit data flow from the system memory 62 is transferred via the PCI interface 12 and the bus interface unit 16 to the internal transmit SRAM buffer 18b that supplies the transmit data via the MAC block 26 to the network 50. The memory management unit (MMU) 24 manages the internal receive and transmit data flows.

Accordingly, a CPU 64 controlling data flows to and from the system memory 52 performs write access to the transmit SRAM buffer 18b to transfer transmit data from the system memory 52 to the transmit SRAM buffer 18b. Also, the CPU 64 performs read access to the receive SRAM buffer 18a to transfer receive data from the receive SRAM buffer 18a to the system memory 52. When the CPU 64 performs write access to the transmit SRAM buffer 18b, the MMU 24 generates write pointers indicating SRAM buffer locations at which transmit data should be written. When the CPU 64 performs read access to the receive SRAM buffer 18b, the MMU 24 generates read pointers indicating SRAM buffer locations from which receive data should be read.

In accordance with the present invention, the network interface 10 is configured to enable SRAM-type access as well as FIFO-type access to the SRAM buffers 18a and 18b. The SRAM-type access enables the CPU 64 to access the SRAM buffers 18a and 18b in a random access manner. The FIFO-type access enables the CPU 64 to access the SRAM buffers 18a and 18b in a first-in, first-out manner.

Figure 3:
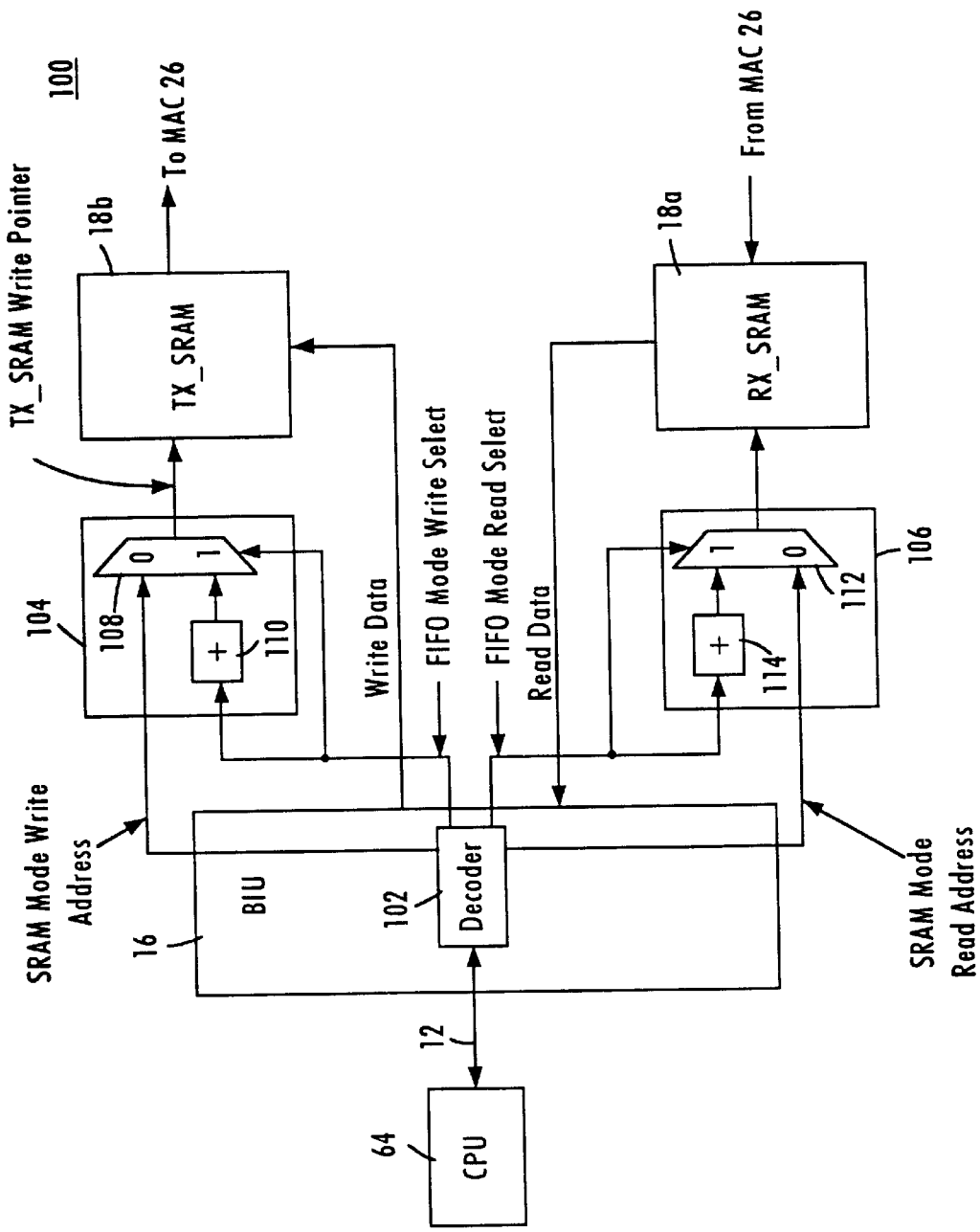
FIG. 3 is a block diagram illustrating a pointer control mechanism of the present invention.

As shown in FIG. 3, a pointer control mechanism 100 is provided in the network interface 10 to control read and write pointers so as to enable SRAM-type access and FIFO-type access to the transmit and receive SRAM buffers 18a and 18b. The pointer control mechanism 100 comprises a decoder 102 for detecting requests for SRAM-type buffer memory access and requests for FIFO-type buffer memory access from the CPU 64. The decoder 102 may be arranged in the BIU 16.

Also, the pointer control mechanism 100 comprises a write pointer control circuit 104 that produces write pointers pointing to transmit SRAM buffer locations to be accessed for wrfiting data, and a read pointer control circuit 106 that generates read pointers pointing to receive SRAM buffer locations to be accessed for reading data. The write pointer control circuit 104 and the read pointer control circuit 106 may be arranged in the MMu 24.

The write pointer control circuit 104 may comprise a write select multiplexer 108 having a FIFO-mode input and a SRAM-mode input, and an output for supplying write pointers to the transmit SRAM buffer 18b. An incrementing circuit 110 is connected to the FfFO-mode input of the write select multiplexer 108.

The read pointer control circuit 106 may comprise a read select multiplexer 112 having a FIFO-mode input and a SRAM-mode input, and an output for supplying read pointers to the receive SRAM buffer 18a. An incrementing circuit 114 is connected to the FIFO-mode input of the read select multiplexer 112.

When the decoder 102 decodes a request for a FIFO-type access from the CPU 64, the decoder 102 places the network interface 10 into a FIFO-type access mode. In this mode, the decoder 102 supplies the incrementing circuit 110 and a control input of the write select multiplexer 108 with a FIFO-mode write select signal which indicates that FIFO-type access is selected for transmit SRAM buffer 18b. Also, the decoder 102 supplies the incrementing circuit 114 and a control input of the.read select multiplexer 108 with a FIFO-mode read select signal which indicates that FIFO-type access is selected for receive SRAM buffer 18a.

The incrementing circuits 110 and 114 performs incrementing of the FIFO-mode write and read select signals to provide sequential addressing of the transmit SRAM buffer 18b and receive SRAM buffer 18a, respectively. The FIFO-mode write and read select signals supplied to the control inputs of the write and read select multiplexers 108 and 112 enable these multiplexers to pass sequential address signals produced by the incrementing circuits 110 and 114 to address inputs of the transmit and receive SRAM buffers 18b and 18a, respectively.

Thus, write data transferred from the system memory 62 via the PCI bus 12 may be written in the transmit SRAM buffer 18b in a first-in, first-out manner. Similarly, read data to be transferred to the system memory 62 via the PCI bus 12 may be retrieved from the receive SRAM buffer 18a in a first-in, first-out manner.

When the decoder 102 decodes a request for SRAM-type access from the CPU 64, the decoder 102 places the network interface into a SRAM-type access mode. In this mode, the decoder 102 supplies the SRAM input of the write select multiplexer 108 with a write address signal provided by the CPU 64 via the PCI bus 12. The write address signal indicates addresses for writing data in the transmit SRAM buffer 18b in a random access manner. Also, the decoder 102 supplies the SRAM input of the read select multiplexer 112 with a read address signal provided by the CPU 64 via the PCI bus 12. The read address signal indicates addresses for reading data from the transmit SRAM buffer 18b in a random access manner.

As the FIFO-mode write and read select signals are not asserted in the SRAM mode, the write and read select multiplexers 108 and 112 pass the write and read address signals to the address inputs of the transmit and receive SRAM buffers 18b and 18a, respectively. As a result, write data transferred from the system memory 62 via the PCI bus 12 may be written in the transmit SRAM buffer 18b in a random access manner. Similarly, read data to be transferred to the system memory 62 via the PCI bus 12 may be retrieved from the receive SRAM buffer 18a in a random access manner.

In this disclosure, there are shown and described only the preferred embodiments of the invention, but it is to be understood that the invention is capable of changes and modifications within the scope of the inventive concept as expressed herein.

What is claimed is:

1. A network interface controlled by a host, comprising:
   a host interface for providing interface to the host,
   a buffer memory for temporarily storing data, and
   an access control system for providing the host with SRAM-type access to the buffer memory in a SRAM mode of operation, and with FIFO-type access to the buffer memory in a FIFO mode of operation, the access control system including a pointer control mechanism for producing pointers to locations of the buffer memory to be accessed in the SRAM mode and FIFO mode,
   wherein the pointer control mechanism comprises a decoder for detecting requests from the host for the SRAM-type access and the FIFO-type access.

2. The network interface of claim 1, wherein the pointer control mechanism further comprises a pointer control circuit responsive to a select signal from the decoder for providing sequential addressing of the buffer memory in the FIFO mode.

3. The network interface of claim 2, wherein the pointer control circuit is responsive to an address signal from the host for providing random-access addressing of the buffer memory in the SRAM mode.

4. The network interface of claim 3, wherein the-pointer control circuit comprises a select multiplexer having a FIFO-mode input and a SRAM-mode input.

5. The network interface of claim 4, wherein the pointer control circuit further comprises an incrementing circuit coupled to the FIFO-mode input of the multiplexer.

6. The network interface of claim 5, wherein the incrementing circuit is supplied with the select signal from the decoder.

7. The network interface of claim 6, wherein the select multiplexer has a control input supplied by the select signal from the decoder.

8. The network interface of claim 4, wherein the SRAM-mode input is supplied with the address signal from the decoder.

9. A communication device controlled by a host, comprising
   a host interface for providing interface to the host,
   a transmit buffer for temporarily storing transmit data,
   a receive buffer for temporarily storing receive data, and
   a pointer control mechanism for controlling write pointers to locations of the transmit buffer so as to enable the host to write the transmit data in a random access manner and in a FIFO manner, and for controlling read pointers to locations of the receive buffer so as to enable the host to read the receive data in a random access manner and in a FIFO manner.

10. The device of claim 9, wherein the pointer control mechanism comprises a write pointer control circuit for producing the write pointers.

11. The device of claim 10, wherein the pointer control mechanism further comprises a read pointer control circuit for producing the read pointers.

12. The device of claim 11, wherein the pointer control mechanism further comprises a decoder responsive to a FIFO-type access request from the host for supplying the write pointer control circuit and read pointer control circuit with a select signal to provide sequential addressing of the transmit buffer and the receive buffer.

13. The device of claim 12, wherein the decoder is responsive to a SRAM-type access request from the host for supplying the write pointer control circuit and read pointer control circuit with an address signal to provide random-access addressing of the transmit buffer and the receive buffer.

14. A method of providing a host with assess to a memory, comprising:

decoding whether the host issues a SRAM-type access request or a FIFO-type access request to perform access to the memory, controlling pointers to the memory so as to perform sequential addressing of the memory in response to the FFFO-type access request, and controlling the pointers. to the memory so as to perform random access addressing of the memory in response to the SRAM-type request.

15. The method of claim 14, wherein the memory comprises a transmit portion for storing transmit data and a receive portion for storing receive data.

16. The method of claim 15, wherein write pointers to the transmit portion and read pointers to the receive portions are controlled in response to the SRAM-type access request to write the transmit data and read the receive data in a random access fashion.

17. The method of claim 16, wherein write pointers to the transmit portion and read pointers to the receive portions are controlled in response to the FIFO-type access request to write the transmit data and read the receive data in a FIFO fashion.

* * * * *

UNITED STATES PATENT AND TRADEMARK OFFICE
CERTIFICATE OF CORRECTION

PATENT NO. : 6,424,591 B1
DATED : July 23, 2002
INVENTOR(S) : Ching Yu et al.

It is certified that error appears in the above-identified patent and that said Letters Patent is hereby corrected as shown below:

<u>Column 7,</u>
Line 6, change "FFFO-type" to -- FIFO-type --.

Signed and Sealed this

Twentieth Day of May, 2003

JAMES E. ROGAN
*Director of the United States Patent and Trademark Office*